United States Patent
Yin et al.

(10) Patent No.: US 12,087,084 B2
(45) Date of Patent: Sep. 10, 2024

(54) IMAGE SENSING DEVICE AND IMAGE SENSING METHOD

(71) Applicant: Guangzhou Tyrafos Semiconductor Technologies Co., Ltd., Guangzhou (CN)

(72) Inventors: Ping-Hung Yin, Hsinchu (TW); Chia-Cheng Yang, Taipei (TW); Yung-Ming Chou, Hsinchu (TW); Pei-Ting Tsai, Hsinchu County (TW)

(73) Assignee: Guangzhou Tyrafos Semiconductor Tech. Co., Ltd., Guangzhou (CN)

( * ) Notice: Subject to any disclaimer, the term of this patent is extended or adjusted under 35 U.S.C. 154(b) by 0 days.

(21) Appl. No.: 18/494,578

(22) Filed: Oct. 25, 2023

(65) Prior Publication Data
US 2024/0242529 A1  Jul. 18, 2024

(30) Foreign Application Priority Data

Jan. 16, 2023  (TW) ................................ 112101813

(51) Int. Cl.
*G06V 40/13* (2022.01)
(52) U.S. Cl.
CPC ................................ *G06V 40/1318* (2022.01)
(58) Field of Classification Search
CPC .......... G06V 40/1318; G06T 5/94; G06T 7/90
See application file for complete search history.

(56) References Cited

U.S. PATENT DOCUMENTS 9,179,062 B1 * 11/2015 Rivard ................... H04N 23/80

FOREIGN PATENT DOCUMENTS

| CN | 109729279 A | * | 5/2019 | |
| CN | 110930335 A | * | 3/2020 | ............. G06T 5/008 |
| WO | WO-2021179670 A1 | * | 9/2021 | ........... G06K 9/0004 |

* cited by examiner

Primary Examiner — Abhishek Sarma
(74) Attorney, Agent, or Firm — Lin & Associates Intellectual Property, Inc.

(57) ABSTRACT

The present invention provides an image sensing device and an image sensing method. The image sensing device comprises an image sensing array and an image processing circuit. The image sensing array obtains a first frame for a test object, and the first frame comprises a plurality of first pixel values. The image processing circuit analyzes the first frame, and generate an overexposure area for the first pixel values greater than a first threshold in the first frame. Then, the image sensor array obtains a second frame for the overexposure area, and the second frame comprises a plurality of second pixel values. The image processing circuit performs a detection processing on all the first pixel values in the first frame, which retains the first pixel values outside of the overexposure area in the first frame, and replaces the first pixel values in the overexposure area with the second pixel values.

8 Claims, 10 Drawing Sheets

IMAGE SENSING DEVICE AND IMAGE SENSING METHOD

CROSS-REFERENCE TO RELATED APPLICATION

This application claims the priority of Taiwanese patent application No. 112101813, filed on Jan. 16, 2023, which is incorporated herewith by reference.

BACKGROUND OF THE INVENTION

1. Field of the Invention

The present invention relates generally to an image sensing device and image sensing method.

2. The Prior Arts

Fingerprint identification technology has developed so far and has become a standard feature for most smart phones. The advantage of fingerprint identification is that fingerprints are unique features of the human body, and the complexity of fingerprints is sufficient for identification. In addition, when it is necessary to increase reliability, only more fingerprints need to be registered and more fingers identified, e.g., up to ten fingerprints and each fingerprint is unique. Furthermore, it is very fast and easy to use to scan fingerprints, which is also a major reason why fingerprint identification technology has the biggest share of the market.

However, the identification capability index in fingerprint identification technology is an important indicator. The identification capability index represents an indicator for evaluating or comparing the performance of a biometric security system, including the False Acceptance Rate (FAR) and the False Rejection Rate (FRR). It should be further explained that the FAR indicates the probability that the biometric system misidentifies an illegal user as a legitimate user, that is, the security level of the biometric system; the FRR indicates the probability that the biometric system misidentifies a legitimate user as an illegal user, that is, the convenience of the biometric system. Therefore, how to reduce FAR and increase the FRR is one of the issues to be solved by researchers.

In addition, when using optical fingerprint identification to unlock, the fingers are not often fully pressed due to the use of different finger widths or changes in pressing angles, or the strong light from the environment may cause the fingerprint image over-exposed due to side leakage, resulting in identification failure. Generally, the common optical fingerprint identification image sensors use fixed exposure time settings. Therefore, once the above phenomenon occurs and the identification fails, the user can only press again. However, if the number of failures is too many, the user experience will be significantly reduced or even locked out.

Therefore, after observing the above-mentioned deficiencies, the following invention is proposed.

SUMMARY OF THE INVENTION

A primary objective of the present invention is to provide an image sensing method, which analyzes the first frame through an analysis step, and generates an overexposure area according to the first pixel values in the first frame that is greater than a first threshold, and then obtains a plurality of second frames for the overexposure area, wherein the image processing circuit retains the first pixel values located outside the overexposure area, and replaces the first pixel values located within the overexposure area in the first frame with second pixel values obtained from image processing to produce a third frame with clear image details. As such, the image sensing method of the present invention can present a complete fingerprint image of a larger area to solve the problem of image overexposure and improve the success rate of fingerprint identification.

In order to achieve the aforementioned objective, the present invention provides an image sensing method, comprising the following steps: a first sensing step, an image sensing array obtaining a first frame, the first frame comprising a plurality of first pixel values; an analysis step, an image processing circuit analyzing the first frame, and generating an overexposure area comprising the first pixel values in the first frame being greater than a first threshold; a second sensing step, the image sensing array obtaining a plurality of second frames for the overexposure area, and the second frames comprising a plurality of second pixel values; a detection processing step, the image processing circuit performing detection processing on the first pixel values one by one; and a combination step, the image processing circuit combining the first pixel values and the second pixel values into a third frame according to the result of the detection processing step; wherein, the detection processing step comprising: a retaining step, the image processing circuit retaining the first pixel values located outside the overexposure area in the first frame; a superposition fusion step, the image processing circuit replacing the first pixel values located in the overexposure area in the first frame with the second pixel values obtained by an image processing.

Preferably, according to the image sensing method of the present invention, the superposition fusion step comprises the following steps: a superposition step, the image processing circuit replacing the first pixel values located in the overexposure area and greater than a second threshold with the superimposed second pixel values of the second frames; and a fusion step, the image processing circuit replacing the first pixel values in the overexposure area and less than or equal to the second threshold with the pixel value fused with the second pixel values.

Preferably, according to the image sensing method of the present invention, an exposure time of the first frame is greater than an exposure time of the second frame.

Preferably, according to the image sensing method of the present invention, the first frame has a plurality of first pixel value sets, and the first pixel value sets are formed by adjacent the first pixel values in a first direction; the first pixel value sets are arranged along a second direction; the analysis step further comprises the following steps: a first scanning step, the image processing circuit scanning the first pixel value sets along the second direction one by one; the scanning being performed in a manner that the first pixel values being scanned along the first direction one by one to confirm the number of the first pixel values greater than the first threshold and generate a plurality of first quantity information; and a first overexposure boundary generation step, based on whether the first quantity information being greater than a third threshold, determining whether each first pixel value set being the overexposure area, and generating a plurality of first overexposures boundary extending along the first direction.

Preferably, according to the image sensing method of the present invention, the first frame has a plurality of second pixel value sets, and the second pixel value sets are formed by adjacent first pixel values in a second direction; the second pixel value sets are arranged along a first direction;

the analysis step further comprises the following steps: a second scanning step, the image processing circuit scanning the second pixel value sets along the first direction one by one; the scanning being performed in a manner that the second pixel values being scanned along the second direction one by one to confirm the number of the first pixel values greater than the first threshold and generate a plurality of second quantity information; and a second overexposure boundary generation step, based on whether the second quantity information being greater than a third threshold, determining whether each second pixel value set being the overexposure area, and generating a plurality of second overexposures boundary extending along the second direction.

Moreover, to achieve the aforementioned objective, the present invention further provides an image sensing device based on the above image sensing method, including: an image sensing array for obtaining a first image of a test object, the first picture frame comprising a plurality of first pixel values; and an image processing circuit, coupled to the image sensing array, the image processing circuit being used to analyze the first frame, and generating an overexposure area comprising the first pixel values in the first frame greater than a first threshold; wherein, after the image processing circuit generating the overexposure area, the image sensing array generating a plurality of second frames for the overexposure area, the second frames comprising a plurality of second pixel values, and the image processing circuit performing a detection processing on the first pixel values in the first frame to retain the first pixel values located outside the overexposure area in the first frame and replace the first pixel values located in the overexposure area in the first frame with the second pixel values obtained after an image processing, and then the image processing circuit combining the first pixel values and the second pixel values into a third frame according to the result of the detection processing.

Preferably, according to the image sensing device of the present invention, the image processing is to replace the first pixel values located in the overexposure area and greater than a second threshold with the superimposed second pixel values, and replace the first pixel values located in the overexposure area and less than or equal to the second threshold with the first pixel values fused with the second pixel values.

In summary, the image sensing device of the present invention, combined with the image sensing method, can analyze the first frame through the analysis step, and generate an overexposure area according to the first pixel value in the first frame and is greater than the first threshold, and obtain a plurality of second frames for the overexposure area, wherein the image processing circuit retains the first pixel value located outside the overexposure area, and replaces the first pixel value located within the overexposure area in the first frame with the second pixel values obtained after image processing to produce a third frame with clear image details. Thereby, the image sensing method according to the present invention can present a complete fingerprint image of a larger area to solve the problem of image overexposure and improve the success rate of fingerprint identification.

The present invention will be apparent to those skilled in the art by reading the following detailed description of a preferred embodiment thereof, with reference to the attached drawings.

DETAILED DESCRIPTION OF THE PREFERRED EMBODIMENT

The accompanying drawings are comprised to provide a further understanding of the invention, and are incorporated in and constitute a part of this specification. The drawings illustrate embodiments of the invention and, together with the description, serve to explain the principles of the invention.

The inventive concept will be explained more fully hereinafter with reference to the accompanying drawings in which exemplary embodiments of the inventive concept are shown. Advantages and features of the inventive concept and methods for achieving the same will be apparent from the following exemplary embodiments, which are set forth in more details with reference to the accompanying drawings. However, it should be noted that the present inventive concept is not limited to the following exemplary embodiments, but may be implemented in various forms. Accordingly, the exemplary embodiments are provided merely to disclose the inventive concept and to familiarize those skilled in the art with the type of the inventive concept. In the drawings, exemplary embodiments of the inventive concepts are not limited to the specific examples provided herein and are exaggerated for clarity.

The terminology used herein is used to describe particular embodiments only, and is not intended to limit the present invention. As used herein, the singular terms "a" and "the" are intended to include the plural forms as well, unless the context clearly dictates otherwise. As used herein, the term "and/or" includes any and all combinations of one or more of the associated listed items. It will be understood that when an element is referred to as being "connected" or "coupled" to another element, it can be directly connected or coupled to the other element or intervening elements may be present.

Similarly, it will be understood that when an element (e.g., a layer, region, or substrate) is referred to as being "on" another element, it can be directly on the other element or intervening elements may be present. In contrast, the term "directly" means that no intervening elements are present. It should be further understood that when the terms "comprising" and "including" are used herein, it is intended to indicate the presence of stated features, steps, operations, elements, and/or components, but does not exclude one or more other features, steps, operations, elements, components, and/or the presence or addition of groups thereof.

Furthermore, exemplary embodiments in the detailed description are set forth in cross-section illustrations that are idealized exemplary illustrations of the present inventive concepts. Accordingly, the shapes of the exemplary figures may be modified according to manufacturing techniques and/or tolerable errors. Therefore, the exemplary embodiments of the present inventive concept are not limited to the specific shapes shown in the exemplary figures, but may include other shapes that may be produced according to the manufacturing process. The regions illustrated in the figures have general characteristics and are used to illustrate specific shapes of elements. Therefore, this should not be considered limited to the scope of this creative concept.

It will also be understood that, although the terms "first," "second," "third," etc. may be used herein to describe various elements, these elements should not be limited by these terms. These terms are only used to distinguish each element. Thus, a first element in some embodiments could be termed a second element in other embodiments without departing from the teachings of the present creation. Exemplary embodiments of aspects of the present inventive concept illustrated and described herein include their complementary counterparts. Throughout this specification, the same reference numbers or the same designators refer to the same elements.

Furthermore, example embodiments are described herein with reference to cross-sectional and/or planar views, which are illustrations of idealized example illustrations. Accordingly, deviations from the shapes shown, for example, caused by manufacturing techniques and/or tolerances, are expected. Accordingly, the exemplary embodiments should not be considered limited to the shapes of the regions shown herein, but are intended to include deviations in shapes resulting from, for example, manufacturing. Thus, the regions illustrated in the figures are schematic and their shapes are not intended to illustrate the actual shape of a region of a device and are not intended to limit the scope of example embodiments.

Figure 1:
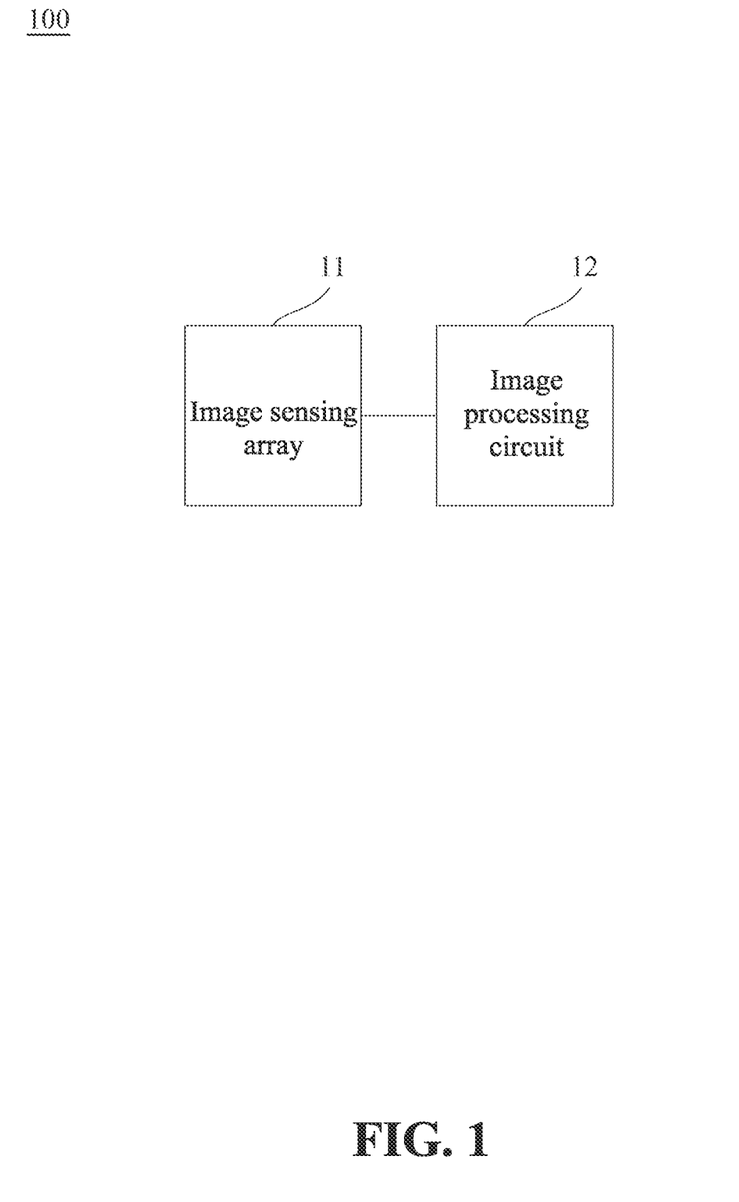
FIG. 1 is a schematic diagram of an image sensing device according to the present invention.
Figure 2:
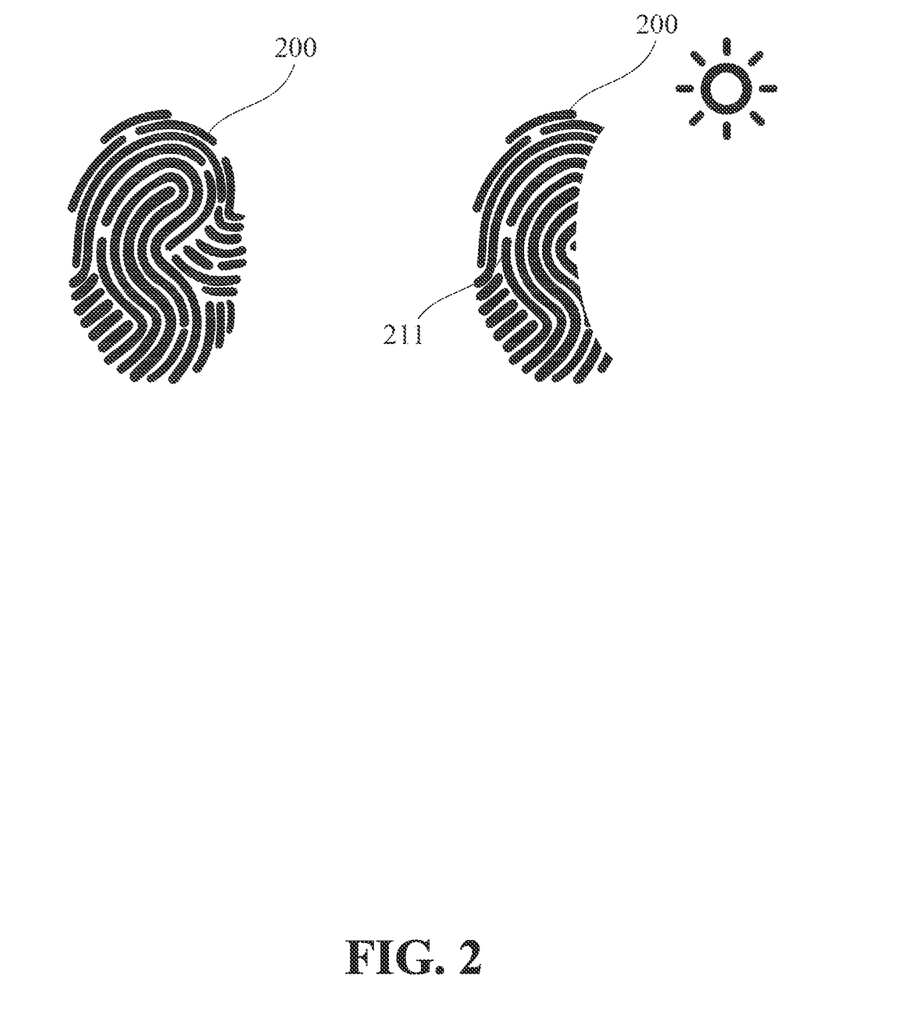
FIG. 2 is a schematic diagram illustrating the first frame according to the present invention.

Refer to FIGS. 1 and 2. FIG. 1 is a schematic diagram of an image sensing device according to the present invention; FIG. 2 is a schematic diagram illustrating the first frame according to the present invention. As shown in FIG. 1, the image sensing device 100 of the present invention comprises: an image sensing array 11 and an image processing circuit 12.

Specifically, as shown in FIGS. 1 and 2, the image sensing array 11 of the present invention is used to obtain the first frame 21 for the test object 200. The first frame 21 comprises a plurality of first pixel values 211, wherein the first frame 21 may be generated by exposing for a first exposure time T1 (not shown). Specifically, as shown in FIG. 2, in some embodiments, the first frame 21 is affected by the ambient light in the imaging environment, causing part of the pixel information of the first frame 21 to be overexposed and lost. However, the present invention is not limited to hereto.

Figure 3:
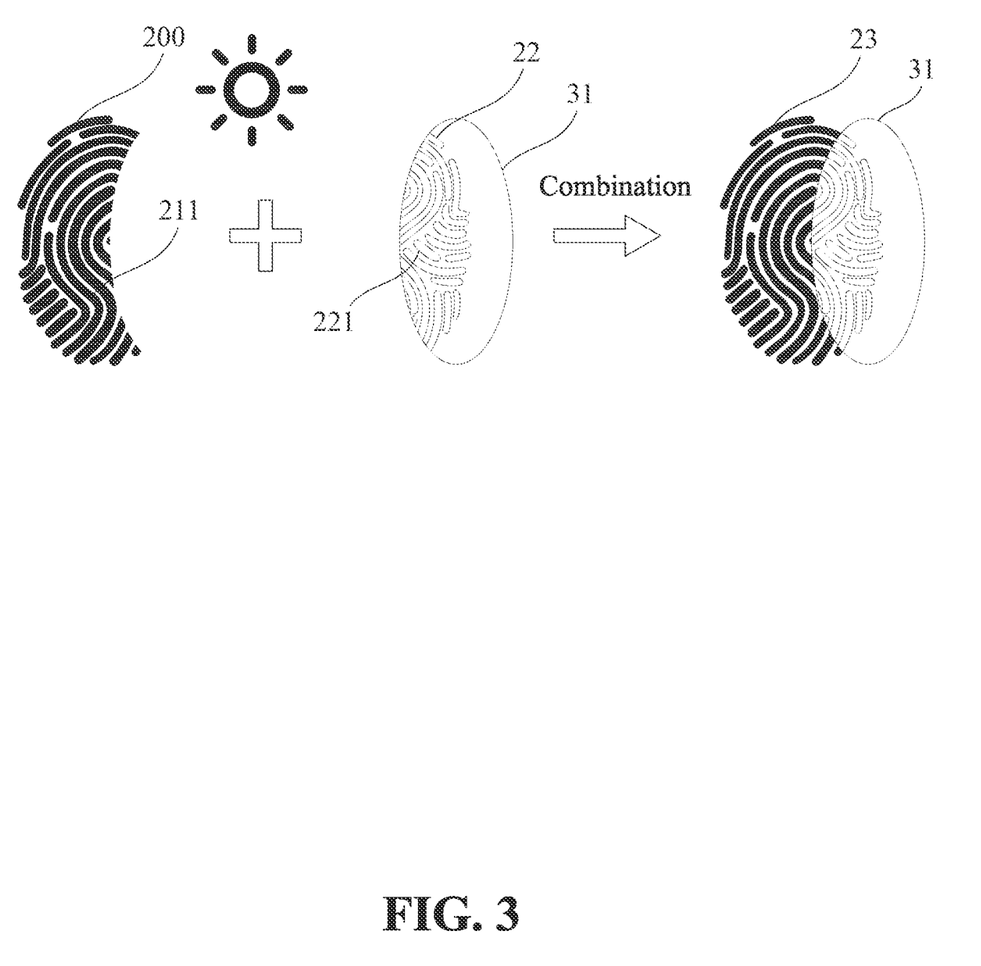
FIG. 3 is a schematic flowchart illustrating the image processing circuit obtaining image according to the present invention.

Specifically, refer to FIG. 3. FIG. 3 is a schematic flowchart illustrating the image processing circuit obtaining an image according to the present invention. As shown in FIGS. 1 to 3, the image processing circuit 12 of the present invention is coupled to the image sensing array 11. The image processing circuit 12 is used to analyze the first frame 21 and generates an overexposure area 31 according to first pixel values 211 of the first frame 21 that are larger than a first threshold. Wherein, after the image processing circuit 12 generates the overexposure area 31, the image sensing array 11 generates a plurality of second frames 22 for the overexposure area 31. The second frames 22 comprise a plurality of second pixel values 221, and the image processing circuit 12 performs a detection processing on all first pixel values 211 in the first frame 21. More specifically, the detection processing retains the first pixel values 211 located outside the overexposure area 31 in the first frame 21, and the image processing circuit 12 replaces the first pixel values 211 located within the overexposure area 31 in the first frame 21 with the second pixel value 221 obtained after performing an image processing. Finally, the image processing circuit 12 combines the first pixel value 211 and the second pixel value 221 into a third frame 23 according to the result of the detection processing.

It should be further explained that in some embodiments, the second frame 22 of the present invention may be generated by exposing for a second exposure time T2 (not shown). The first exposure time T1 for generating the first frame 21 is greater than the second exposure time T2 for generating the second frame 22. As such, overexposure of the second frame 22 generated in the overexposure area 31 can be prevented to ensure that the image sensing device 100 of the present invention obtains a plurality of clear second frames 22. However, the present invention is not limited hereto.

Specifically, in some embodiments, the image sensing array 11 may be a CMOS image sensor (CIS) or a charged coupled device (CCD). In some embodiments, the image processing circuit 12 may be an image signal processor (ISP), a central processing unit (CPU), a microprocessor, or a digital signal processor (DSP), programmable logic controller (PLC), application specific integrated circuit (ASIC), system-on-chip (SoC) or other similar components or a combination of the above components. Moreover, in some embodiments, the image sensing device 100 may further comprise a memory. The memory can be used to store image frames, sensing signals, pixel data, image analysis software or computing software described in various embodiments of the present invention, and the present invention is not limited hereto.

Figure 4:
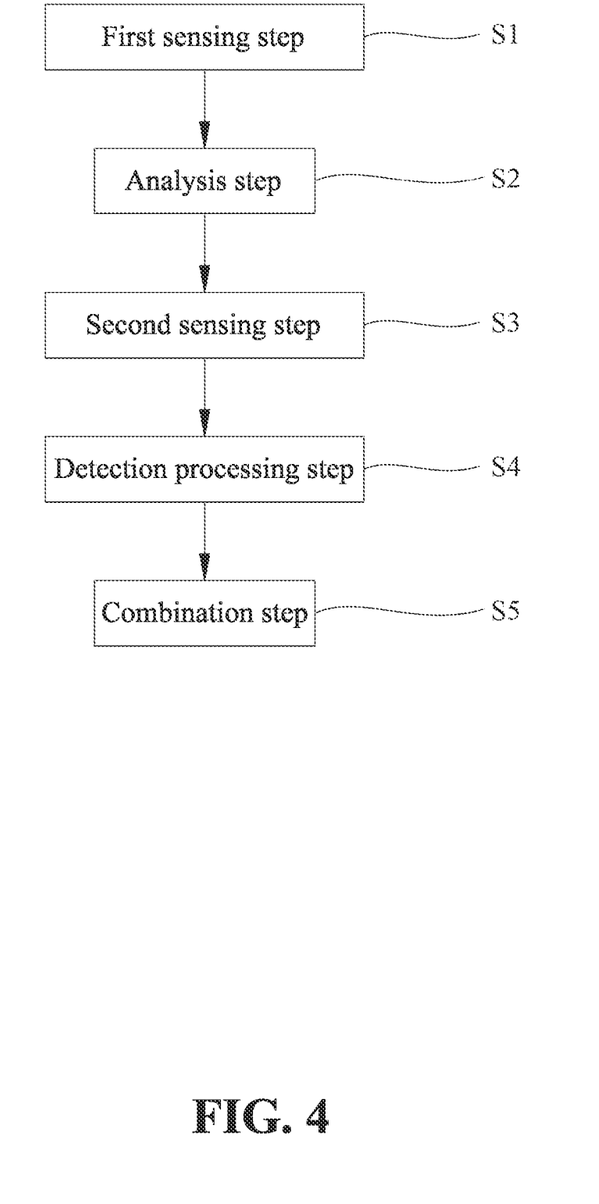
FIG. 4 is a flowchart of an image sensing method according to the present invention.

Refer to FIG. 4, which is a flowchart of an image sensing method according to the present invention. As shown in FIGS. 1 to 4, the image sensing method of the present invention comprises the following steps:

In the first sensing step S1, the image sensing array 11 obtains the first frame 21 for a test object, and the first frame 21 comprises a plurality of first pixel values 211;

In the analysis step S2, the image processing circuit 12 analyzes the first frame 21 and generates an overexposure area 31 for the first pixel value 211 in the first frame 21 that are greater than the first threshold;

In the second sensing step S3, the image sensing array 11 obtains a plurality of second frames 22 for the overexposure area 31, and the second frames 22 comprise a plurality of second pixel values 221;

In the detection processing step S4, the image processing circuit 12 performs a detection processing on all the first pixel values 211 in the first frame 21 one by one; and In the combination step S5, the image processing circuit 12 combines the first pixel value 211 and the second pixel value 221 into the third frame 23 according to the result of the detection processing.

Figure 5:
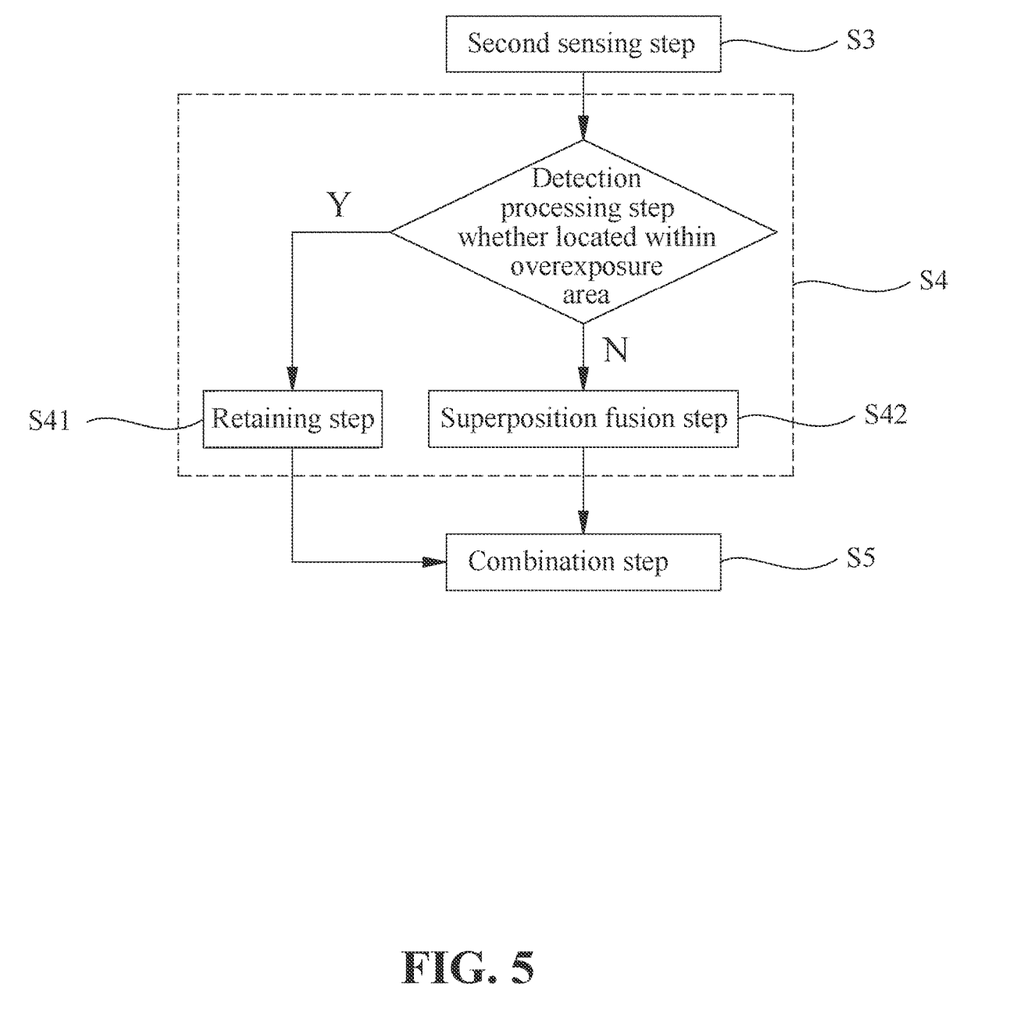
FIG. 5 is a flowchart illustrating detection processing steps according to the present invention.

Specifically, refer to FIG. 5. FIG. 5 is a flowchart illustrating the detection processing step according to the present invention. As shown in FIG. 5, the detection processing step S4 of the present invention further comprises the following steps:

In the retaining step S41, the image processing circuit 12 retains the first pixel value 211 located outside the overexposure area 31 in the first frame 21; and In the superposition fusion step S42, the image processing circuit 12 replaces the first pixel value 211 located in the overexposure area 31 in the first frame 21 with the second pixel values 221 obtained after image processing.

Specifically, in some embodiments, the aforementioned image processing may comprise superimposing a plurality of second pixel values 221, or multiplying the first pixel value 211 and the second pixel value 221 respectively by a specific ratio. More specifically, when the first pixel value 211 located in the overexposure area 31 is less than or equal to a second threshold, the image processing circuit 12 can perform image processing by multiplying the first pixel value 211 and the second pixel value 221 by a specific ratio respectively, followed by performing fusion to generate an image that is not overexposed. For example, the ratio between the first pixel value 211 and the second pixel value 221 may be 9:1, 8:2, 7:3, 6:4, etc. On the other hand, when the first pixel value 211 located in the overexposure area 31 is greater than the second threshold, the image processing circuit 12 can generate a non-overexposed image by superimposing a plurality of second pixel values 221. However, the present invention is not limited hereto.

It should be further explained that in some embodiments, the second exposure time T2 of the second frame 22 can be associated with the number of times the image processing circuit 12 superimposes the second pixel value 221 to generate an non-overexposed image, for example, when the image processing circuit 12 superimposes the second pixel value 221 four times to generate an image that is not overexposed, the second exposure time T2 of the second frame 22 can be one-quarter of the first exposure time T1, so as to avoid boundary gaps when the image processing circuit 12 performs image processing, thereby greatly improving the clarity of the fingerprint image, as well as avoiding blur due to different image processing, and retaining fine image details.

It is worth noting that in some embodiments, the exact values of the first threshold and the second threshold are related to the resolution of the image sensing device itself. For example, when the image sensing device is an 8-bit CMOS image sensor, the color levels of the first threshold and the second threshold can be between 0 and 255. When the image sensing device is a 10-bit CMOS image sensor, the color levels of the first threshold and the second threshold can range from 0 to 1023. Users can choose a more appropriate value based on the needs. However, the present invention should not be construed as being limited to hereto.

In summary, the image sensing device 100 of the present invention generates the overexposure area 31 by analyzing the first pixel value 211 in the first frame 21 that are greater than the first threshold to obtain an overexposure area 31. Then, a plurality of the second frame 22 is obtained from the overexposure area 31; and finally, the image processing circuit 12 retains the first pixel value 211 located outside the overexposure area 31, and replace the first pixel value 211 located in the overexposure area 31 in the first frame 21 with the second pixel values 221 obtained after the image processing to generate the third frame 23. As such, the image sensing method of the present invention can present a complete fingerprint image of a larger area to solve the problem of image overexposure and improve the success rate of fingerprint identification.

Hereinafter, an implementation form of the first embodiment of the image sensing device of the present invention will be described with reference to the drawings.

Figure 6:
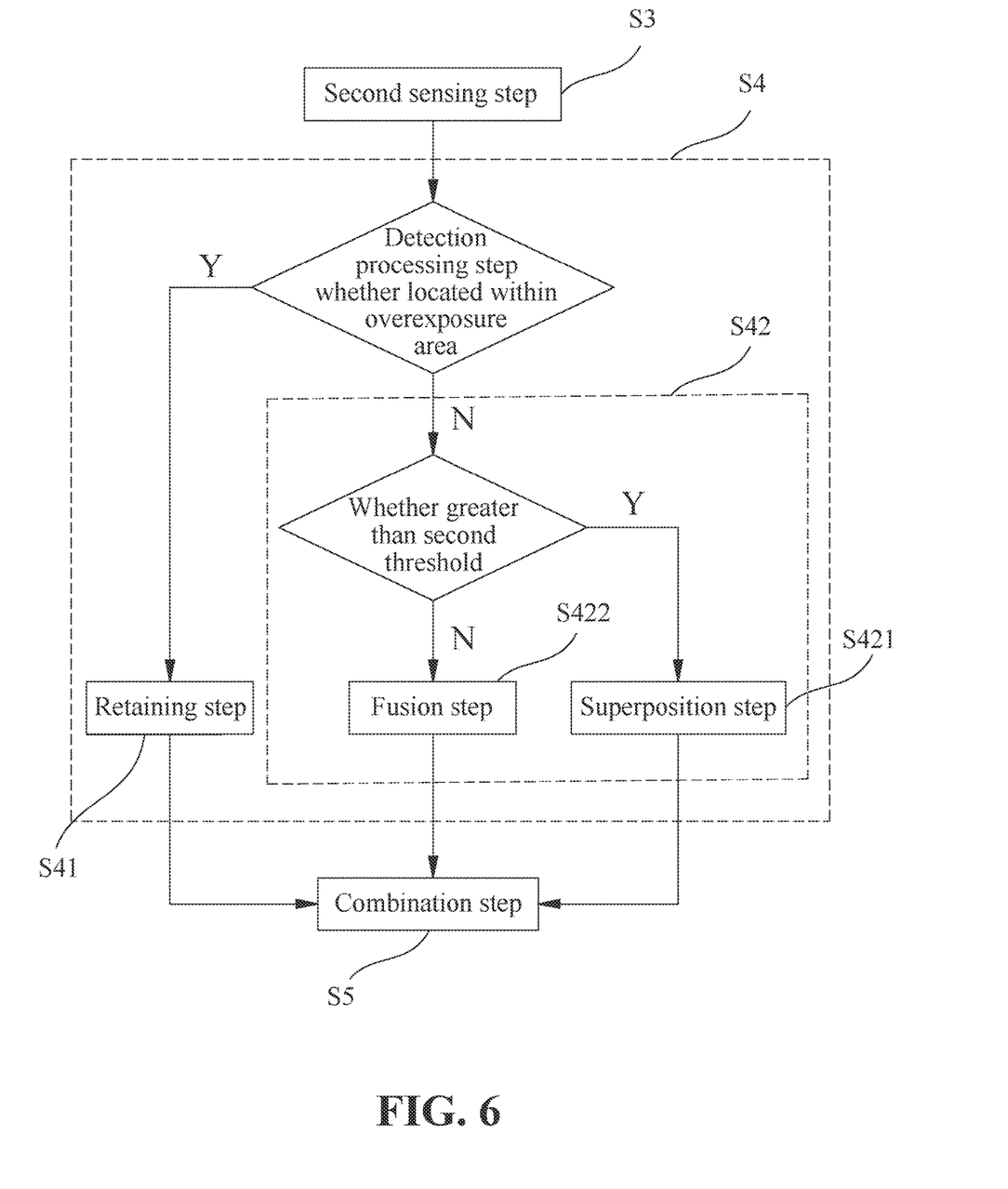
FIG. 6 is a flowchart of the superposition fusion steps according to the first embodiment of the present invention.
Figure 7:
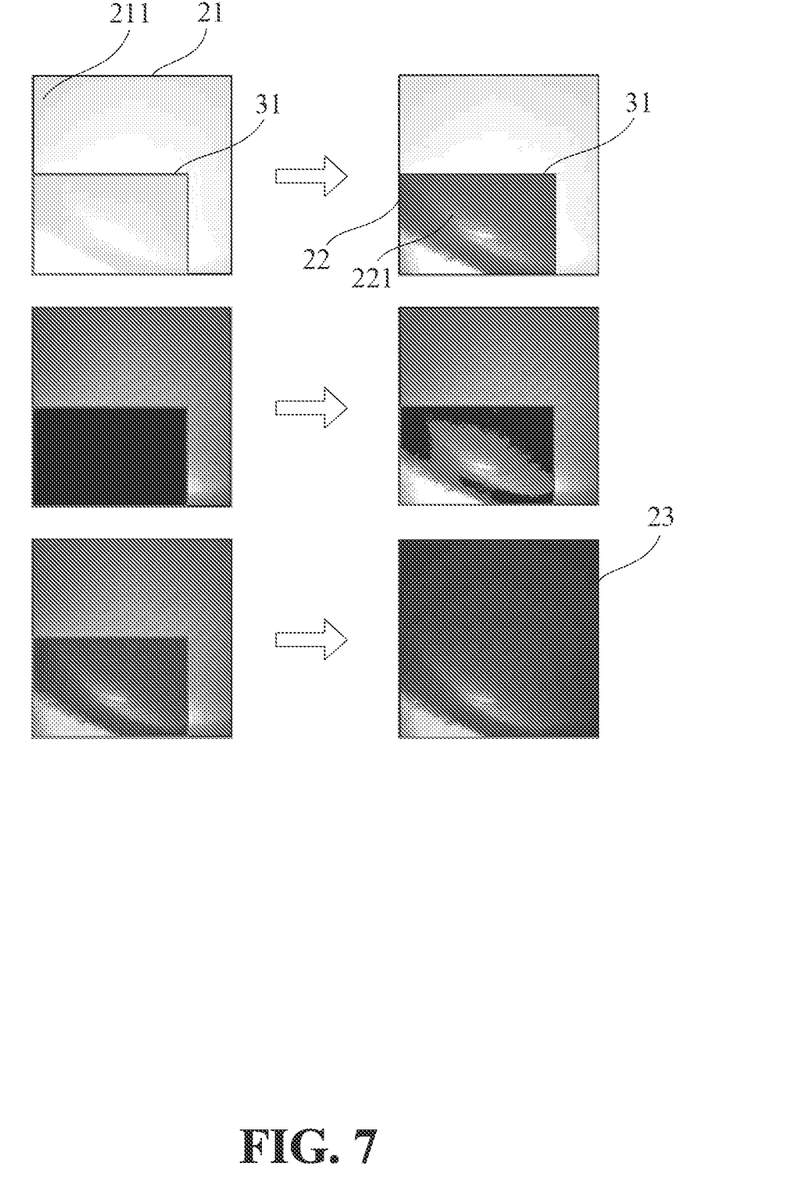
FIG. 7 is a schematic flowchart illustrating the actual execution of the image sensing method according to the first embodiment of the present invention.

Refer to FIG. 6. FIG. 6 is a flowchart of the superposition fusion step according to the first embodiment of the present invention; FIG. 7 is a schematic flowchart illustrating the actual execution of the image sensing method according to the first embodiment of the present invention. As shown in FIGS. 6 and 7, the image sensing method according to the first embodiment of the present invention comprises the following superposition fusion step S42:

In the superposition step S421, the image processing circuit superimposes and replaces the first pixel values located in the overexposure area and greater than a second threshold with the second pixel values of the second frame; and In the fusion step S422, the image processing circuit replaces the first pixel values with the fusion of the first pixel values in the overexposure area and is less than or equal to the second threshold with the first pixel values and the second pixel values.

Referring to FIGS. 4, 6, and 7, the actual execution process of the image sensing method according to the first embodiment of the present invention is described as follows: First, the first sensing step S1 is performed, wherein the image sensing array 11 obtains the first frame 21, and the first frame 21 comprises a plurality of first pixel values 211; then, the analysis step S2 is performed, wherein the image processing circuit 12 analyzes the first frame 21 to generate an overexposure area 31 for the first pixel value 211 in the first frame 21 and are greater than the first threshold; after that, the second sensing step S3 is performed, wherein the image sensing array 11 obtains a plurality of second frames 22 for the overexposure area 31, and the second frames 22 comprise a plurality of second pixel values. 221; then, the detection processing step S4 is executed, wherein the image processing circuit 12 performs a detection processing for each first pixel values 211 in the first frame 21 one by one; in the detection processing according to the first embodiment of the present invention: first, the retaining step S41 is executed, wherein the image processing circuit 12 retains the first pixel value 211 located outside the overexposure area 31 in the first frame 21. Then, the superposition step S421 is executed, wherein the first pixel value 211 in 31 and greater than a second threshold is replaced by the superimposed second pixel values 221 of the second frames 22, and then the fusion step S422 is performed, wherein the image processing circuit 12 replaces the first pixel values 211 in the overexposure area 31 and are less than or equal to the second threshold with the fusion of the first pixel value 211 and the second pixel values 221; finally, the combination step S5 is performed, wherein the image processing circuit 12, according to the result of the detection process, combines the first pixel value 211 and the second pixel value 221 to generate the third frame 23. However, the present invention is not limited hereto.

It should be further explained that, as shown in FIG. 7, in the present embodiment, the first pixel value 211 located outside the overexposure area 31 is not processed to be used with the second pixel value 221. Therefore, when performing the combination step S5, the pixel value range may be between 0-1023 levels (10 bits). On the other hand, for the first pixel value 211 located in the overexposure area 31, due to the image processing and replacement with the second pixel values 221, when performing the combination step S5, the pixel value range can be between 0-4092 levels (12 bits), resulting in an obvious depth difference when the image within the overexposure area 31 is combined with the image outside the overexposure area 31. Therefore, when the third frame 23 is output, the pixel values must be unified, that is, the images outside the overexposure area 31 are regarded as having the same data accuracy, in the present embodiment, the image processing circuit 12 unifies the first pixel values 211 located outside the overexposure area 31 by converting into 12 bits to generate the third frame 23 with consistent data accuracy.

Thus, it can be seen from the above description that, based on the image sensing device 100 of the present invention and combined with the image sensing method according to the first embodiment of the present invention, not only a larger image can be displayed through the third frame 23, but the image processing circuit 12 can also further improve the image accuracy of the third frame 23 and produce a better fingerprint identification effect. As such, the image sensing device 100 of the present invention greatly improves the FAR and FRR performance of the fingerprint identification system to achieve high accuracy and wide applicability.

Other examples of image sensing methods are provided below so that those with ordinary knowledge in the technical field to which the present invention belongs can more clearly understand possible modifications. The components represented by the same component symbols as in the above embodiment are substantially the same as those described in FIGS. 1 to 6, and the components, features, and advantages that are the same as those of the image sensing device 100 will not be repeated again.

Figure 8:
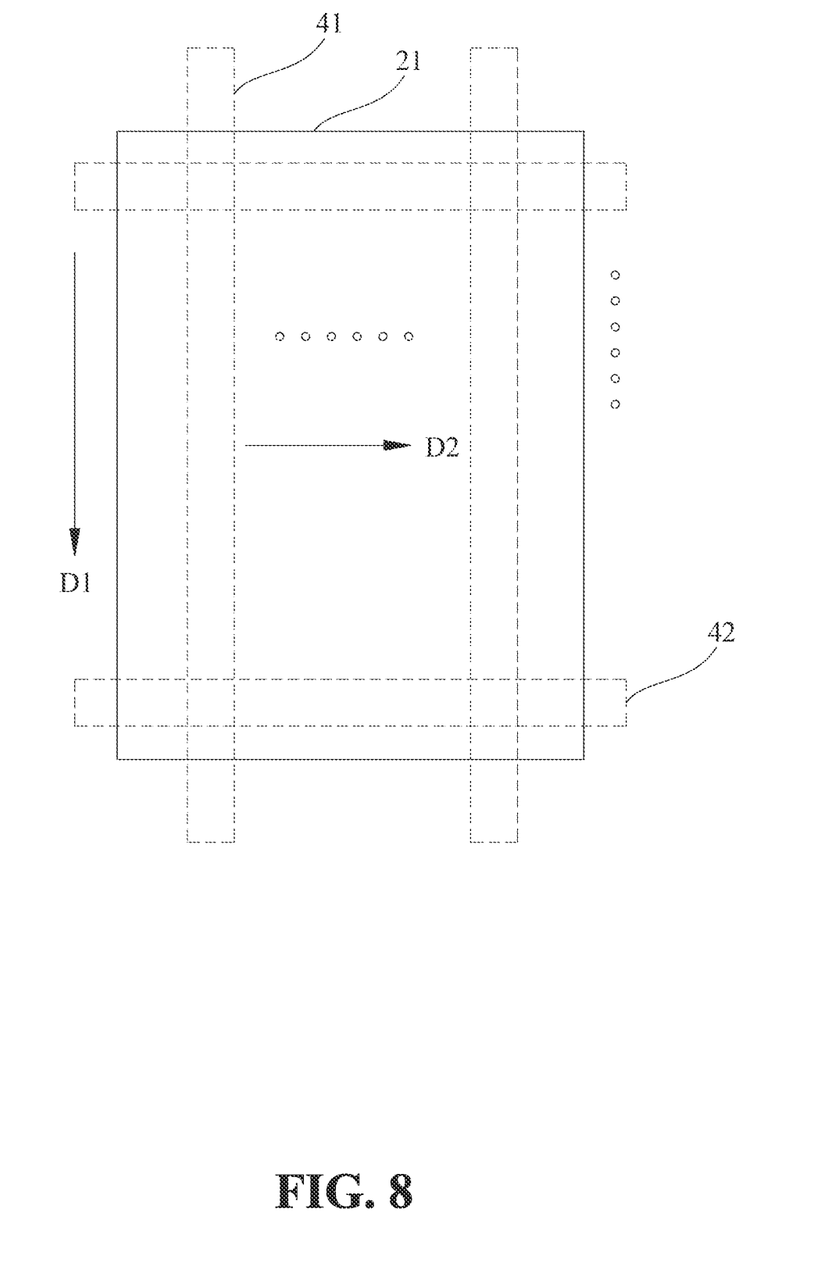
FIG. 8 is a schematic diagram illustrating the first frame according to the second embodiment of the present invention.

Refer to FIG. 8. FIG. 8 is a schematic diagram illustrating the first frame according to the second embodiment of the present invention. As shown in FIG. 8, the first frame 21 according to the second embodiment of the present invention has a plurality of first pixel value sets 41. The first pixel value set 41 comprises adjacent first pixel values 211 in a first direction D1, and the first pixel value sets 41 are arranged along a second direction D2. Furthermore, as shown in FIG. 8, the first frame 21 according to the second embodiment of the present invention has a plurality of second pixel value sets 42, and the second pixel value set 42 comprises the adjacent first pixel values 211 in the second direction D2, and the second pixel value sets 42 are arranged along the first direction D1. More specifically, in the present embodiment, the first direction D1 and the second direction D2 are orthogonal to each other. In addition, the number of the first pixel value sets 41 may be the same as the number of the second pixel value sets 42. However, the present invention is not limited hereto.

Figure 9:
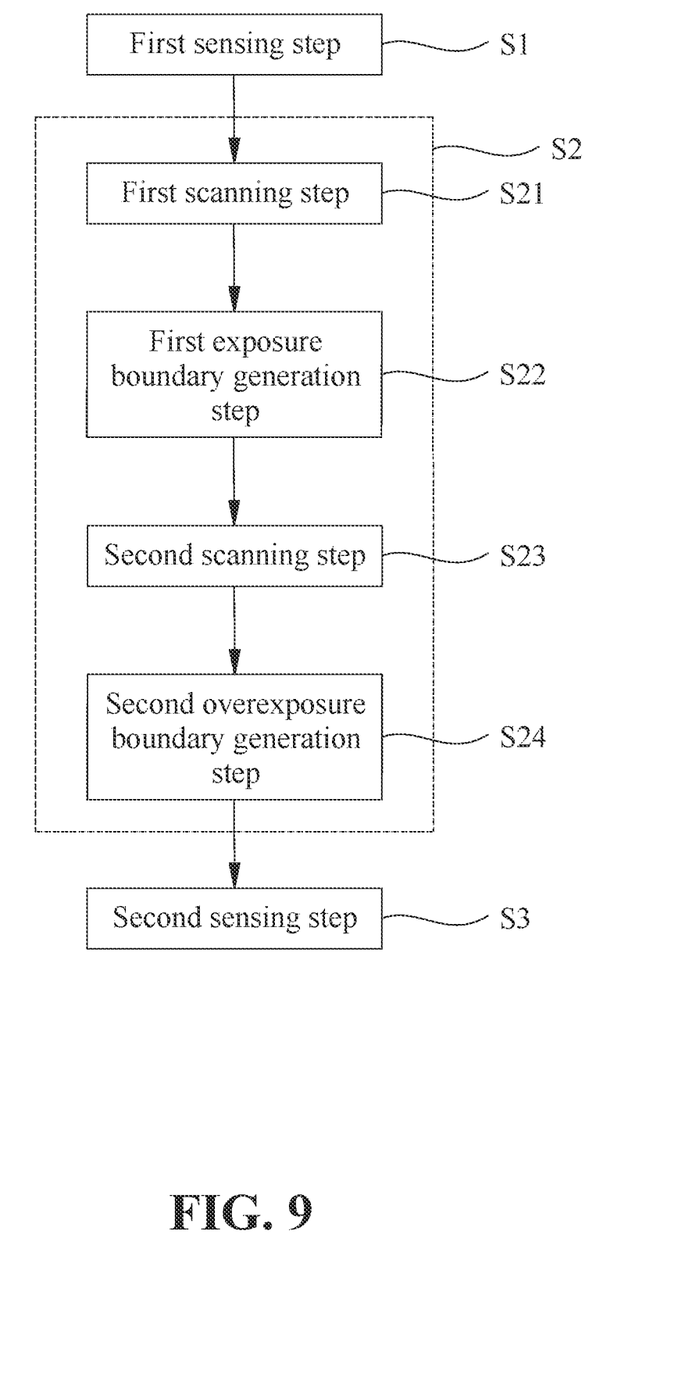
FIG. 9 is a flowchart of analysis steps according to the second embodiment of the present invention.
Figure 10:
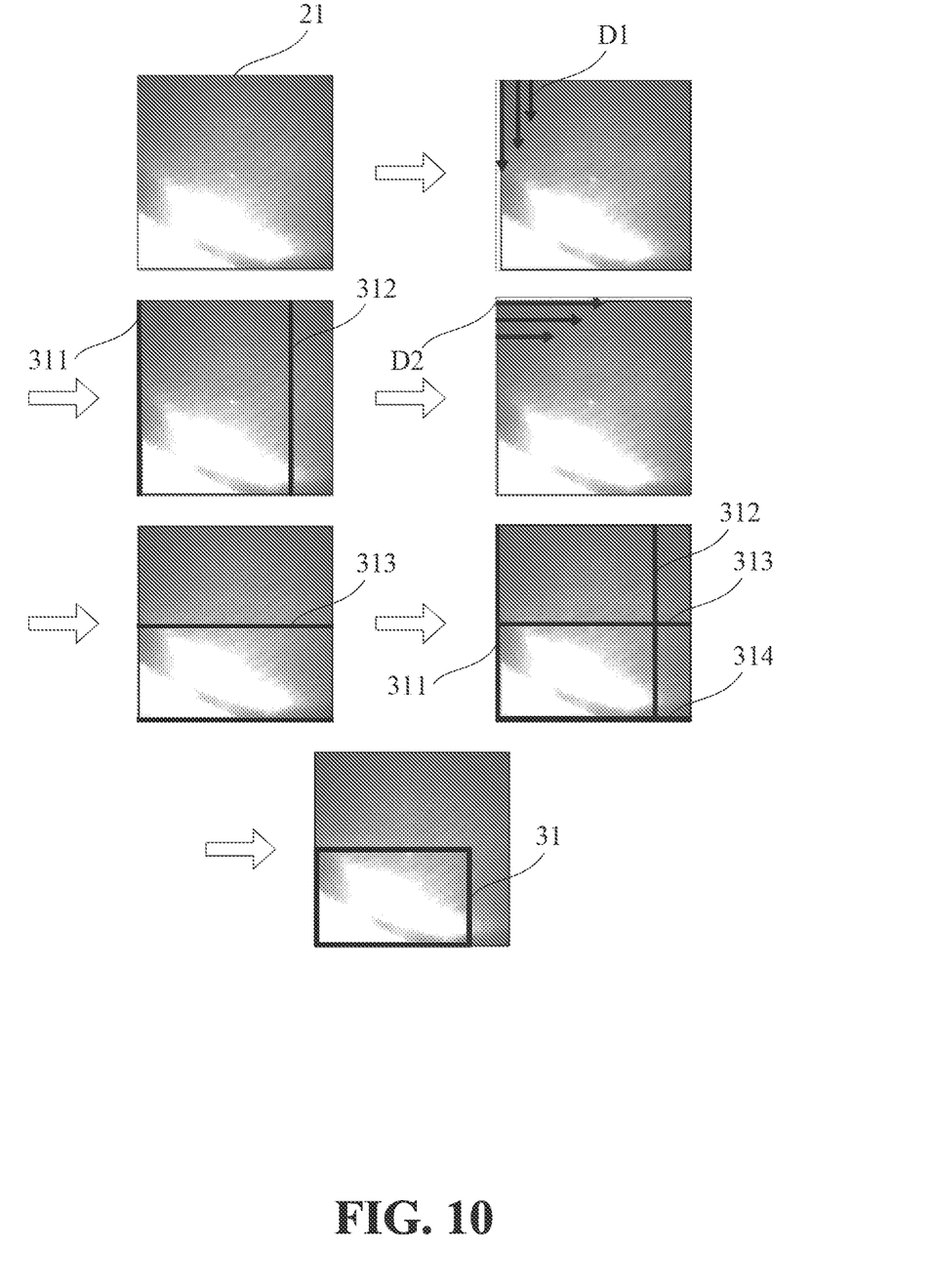
FIG. 10 is a schematic flowchart illustrating the actual execution of the analysis steps according to the second embodiment of the present invention.

Refer to FIGS. 9 and 10. FIG. 9 is a flowchart of the analysis step according to the second embodiment of the present invention; FIG. 10 is a flowchart illustrating the actual execution of the analysis step according to the second embodiment of the present invention. As shown in FIGS. 9 and 10, the image sensing method according to the second embodiment of the present invention comprises the following analysis step S2: First, a first scanning step S21 is performed, wherein the image processing circuit 12 scans the first pixel value sets 41 along the second direction D2 one by one. The scanning method is to confirm the number of the first pixel values 211 greater than the first threshold one by one along the first direction D1 for the first pixel value set 41, and generate a plural of first quantity information; then, a first exposure boundary generation step S22 is performed, wherein the image processing circuit 12 determines whether each first pixel value set 41 is an overexposure area 31 one by one based on whether the first quantity information is greater than a third threshold, and generates first overexposed boundaries 311, 312 extending along the first direction D1; then, a second scanning step S23 is performed, wherein the image processing circuit 12 scans the second pixel value sets 42 one by one along the first direction D1, the scanning manner is to scan first pixel values 211 of the second pixel value set 42 one by one along the second direction D2 to confirm the number of first pixel values 211 greater than the first threshold, and generate a plurality of second quantity information; finally, a second overexposure boundary generation step S24 is performed, wherein the image processing circuit 12 determines whether the second pixel value sets 42 are the overexposure areas one by one according to whether the second quantity information is greater than the third threshold, and generates second overexposure boundaries 313, 314 extending along the second direction D2.

More specifically, according to the second embodiment of the present invention, the first quantity information and the second quantity information respectively indicate that the numbers of first pixel values 211 in the first pixel value sets 41 and the second pixel value sets 42 that are greater than a threshold quantity, and according to the second embodiment of the present invention, the third threshold can be used for judging whether the first quantity information and the second quantity information meet the criterion of the overexposure area 31. The user can select a more appropriate one according to the application needs, for example, the third threshold may be 100, 500, 1000, 1500, etc. According to the second embodiment of the present invention, the third threshold is 1000. However, the present invention is not limited hereto.

It should be further explained that the analysis step S2 of the second embodiment of the present invention can generate the first overexposure boundaries 311 and 312 extending along the first direction D1 and the second overexposure boundaries 313 and 314 extending along the second direction D2; however, the numbers of the first overexposure boundaries and the second overexposure boundaries generated by the above method are not limited to two. In some embodiments, the first frame 21 may have more than two first overexposure boundaries and second overexposure boundaries. It can be understood that the overexposure area 31 generated in the analysis step S2 of the present invention may be discontinuous. The area, or the overexposure area 31 may comprise all the first frames 21. The image processing circuit 12 can generate the best overexposure area 31 according to the first frame 21 in different situations through the above analysis step S2. Thereby, the image sensing method of the present invention can be adapted to various image capturing environments, greatly improving the effect and applicability of the image sensing method of the present invention.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An image sensing method, comprising the following steps:
    a first sensing step, an image sensing array obtaining a first frame, the first frame comprising a plurality of first pixel values;
    an analysis step, an image processing circuit analyzing the first frame, and generating an overexposure area comprising the first pixel values in the first frame being greater than a first threshold;

a second sensing step, the image sensing array obtaining a plurality of second frames for the overexposure area, and the second frames comprising a plurality of second pixel values;

a detection processing step, the image processing circuit performing detection processing on the first pixel values one by one; and a combination step, the image processing circuit combining the first pixel values and the second pixel values into a third frame according to the result of the detection processing step;

wherein, the detection processing step comprising:
a retaining step, the image processing circuit retaining the first pixel values located outside the overexposure area in the first frame;
a superposition fusion step, the image processing circuit replacing the first pixel values located in the overexposure area in the first frame with the second pixel values obtained by an image processing.

2. The image sensing method according to claim 1, wherein the superposition fusion step comprises the following steps: a superposition step, the image processing circuit replacing the first pixel values located in the overexposure area and greater than a second threshold with the superimposed second pixel values of the second frames; and a fusion step, the image processing circuit replacing the first pixel values in the overexposure area and less than or equal to the second threshold with the pixel value fused with the second pixel values.

3. The image sensing method according to claim 1, wherein an exposure time of the first frame is greater than an exposure time of the second frame.

4. The image sensing method according to claim 1, wherein the first frame has a plurality of first pixel value sets, and the first pixel value sets are formed by adjacent the first pixel values in a first direction; the first pixel value sets are arranged along a second direction; the analysis step further comprises the following steps: a first scanning step, the image processing circuit scanning the first pixel value sets along the second direction one by one; the scanning being performed in a manner that the first pixel values being scanned along the first direction one by one to confirm the number of the first pixel values greater than the first threshold and generate a plurality of first quantity information; and a first overexposure boundary generation step, based on whether the first quantity information being greater than a third threshold, determining whether each first pixel value set being the overexposure area, and generating a plurality of first overexposures boundary extending along the first direction.

5. The image sensing method according to claim 4, wherein the first frame has a plurality of second pixel value sets, and the second pixel value sets are formed by adjacent first pixel values in a second direction; the second pixel value sets are arranged along a first direction; the analysis step further comprises the following steps: a second scanning step, the image processing circuit scanning the second pixel value sets along the first direction one by one; the scanning being performed in a manner that the second pixel values being scanned along the second direction one by one to confirm the number of the first pixel values greater than the first threshold and generate a plurality of second quantity information; and a second overexposure boundary generation step, based on whether the second quantity information being greater than a third threshold, determining whether each second pixel value set being the overexposure area, and generating a plurality of second overexposures boundary extending along the second direction.

6. The image sensing method according to claim 5, wherein the first direction and the second direction are orthogonal to each other.

7. An image sensing device, comprising:
an image sensing array for obtaining a first image of a test object, the first picture frame comprising a plurality of first pixel values; and
an image processing circuit, coupled to the image sensing array, the image processing circuit being used to analyze the first frame, and generating an overexposure area comprising the first pixel values in the first frame greater than a first threshold;
wherein, after the image processing circuit generating the overexposure area, the image sensing array generating a plurality of second frames for the overexposure area, the second frames comprising a plurality of second pixel values, and the image processing circuit performing a detection processing on the first pixel values in the first frame to retain the first pixel values located outside the overexposure area in the first frame and replace the first pixel values located in the overexposure area in the first frame with the second pixel values obtained after an image processing, and then the image processing circuit combining the first pixel values and the second pixel values into a third frame according to the result of the detection processing.

8. The image sensing device according to claim 7, wherein the image processing is to replace the first pixel values located in the overexposure area and greater than a second threshold with the superimposed second pixel values, and replace the first pixel values located in the overexposure area and less than or equal to the second threshold with the first pixel values fused with the second pixel values.

* * * * *